United States Patent [19]

Blandino

[11] Patent Number: 5,132,890

[45] Date of Patent: Jul. 21, 1992

[54] POWER SUPPLY BASED ON NORMALLY PARASITIC RESISTANCE OF SOLID STATE SWITCH

[75] Inventor: Tom Blandino, Cottage Grove, Wis.

[73] Assignee: Koss Corporation, Milwaukee, Wis.

[21] Appl. No.: 639,493

[22] Filed: Jan. 9, 1991

[51] Int. Cl.$^5$ .............................................. H02M 3/335
[52] U.S. Cl. .................................... 363/21; 363/49; 363/97; 363/131; 323/284; 323/901
[58] Field of Search ............. 323/222, 284, 901; 363/21, 49, 97, 131

[56] References Cited

U.S. PATENT DOCUMENTS

| | | | |
|---|---|---|---|
| 4,698,743 | 10/1987 | Onodera et al. | 363/49 |
| 4,829,232 | 5/1989 | Erickson | 323/222 |
| 4,845,605 | 7/1989 | Steigerwald | 363/97 |
| 4,888,821 | 12/1989 | Hamp et al. | 363/21 |
| 4,964,028 | 10/1990 | Spataro | 363/21 |
| 5,019,953 | 5/1991 | Kawaberi et al. | 363/21 |

Primary Examiner—Steven L. Stephan
Assistant Examiner—Jeffrey Sterrett
Attorney, Agent, or Firm—Fuller, Ryan, Hohenfeldt & Kees

[57] ABSTRACT

A current mode zero-voltage, parallel resonant switching power supply. The disclosed power supply includes a resonant tank comprising an inductor-capacitor pair, and having a variable output level. A solid-state switch controls the energy input to the tank. A comparator compares the voltage or other signal level from the switch to a threshold level so that the switch is closed when the voltage across it equals the threshold, and opened when the current through it corresponds to the threshold level. In one embodiment the threshold is produced by an error amplifier sensing the power supply output voltage, based on the difference between the output level and a reference level. A startup circuit is provided for energizing the tank when the power supply is initially powered, or under a load dump condition.

6 Claims, 2 Drawing Sheets

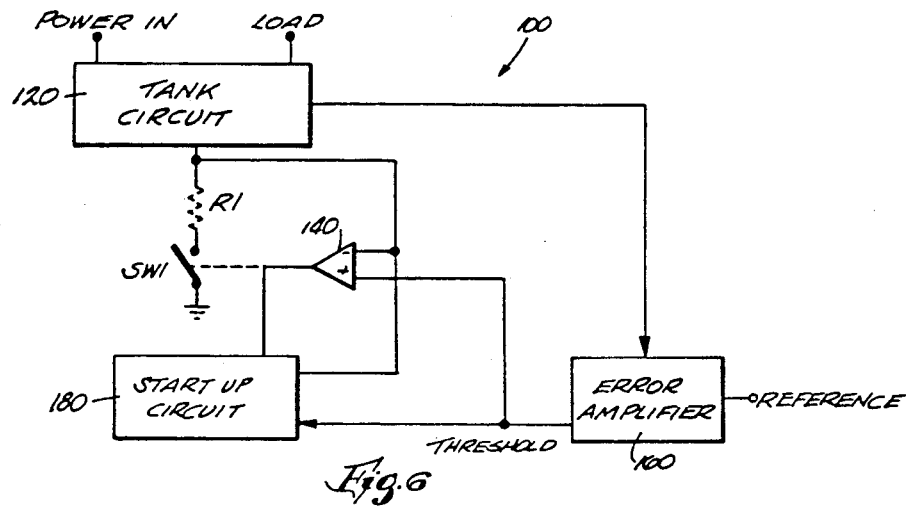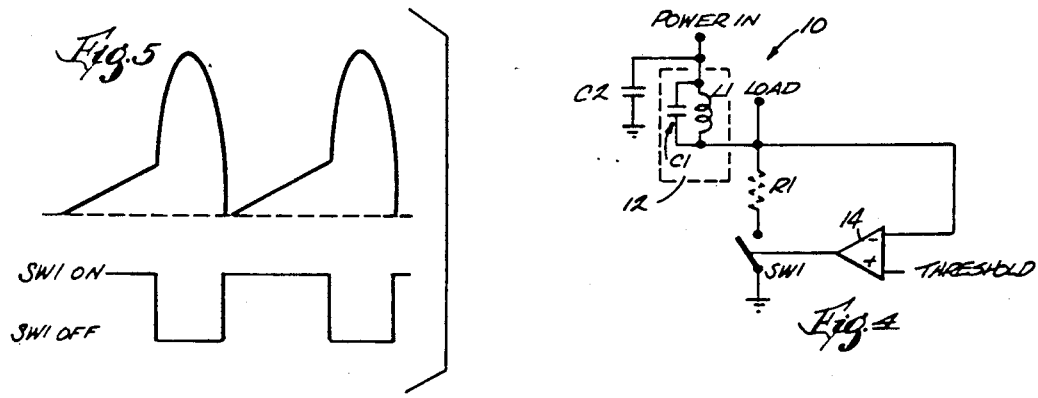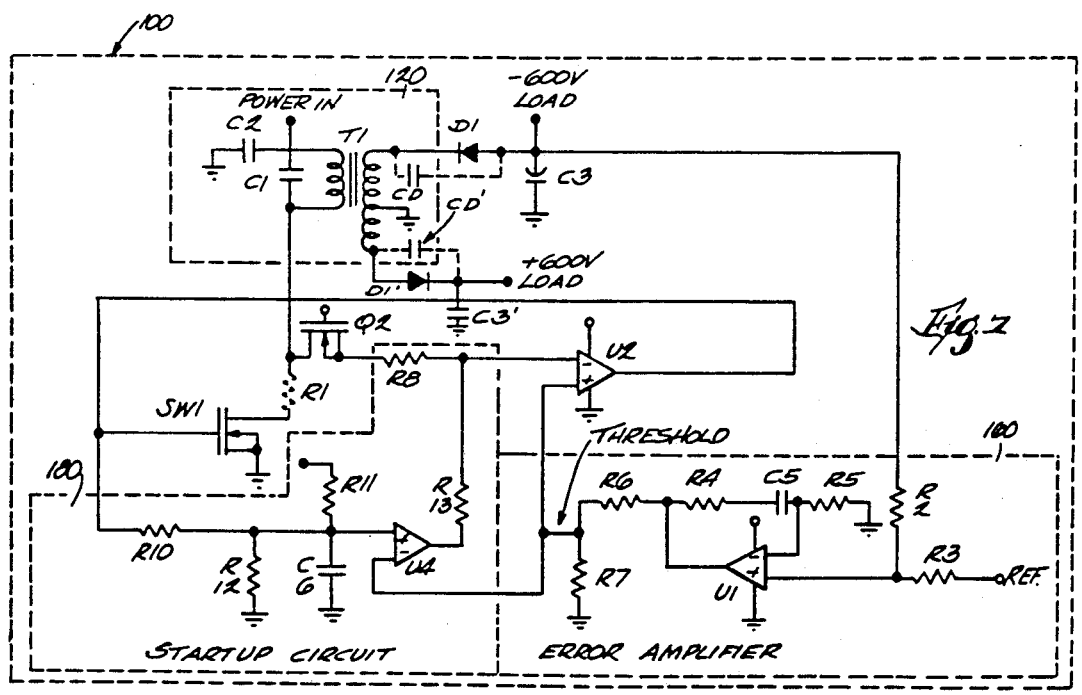

2

POWER SUPPLY BASED ON NORMALLY PARASITIC RESISTANCE OF SOLID STATE SWITCH

BACKGROUND OF THE INVENTION

This invention relates to an electrical switching power supply, and in particular to a power supply, such as for use in connection with electrostatic headphones, capable of delivering high voltages without great loss of power in the switching operation.

Certain applications, such as electrostatic headphones, require a high DC polarization bias and large voltage swings from excitation amplifiers, on the order of ±600 volts for example. Particularly where it is desired to use batteries as the original power source, it is known to use a switching power supply to provide these voltages. Such switching power supplies are generally available in two types, those that employ pulse width modulation (PWM) and resonant types.

PWM power supplies regulate their outputs by fixing the control frequency and varying the on/off time ratio of their power switches, whether junction transistor or FET, in which case the power switch must turn off at high current or voltage conditions, dissipating a significant amount of power during the switching transition. Where the power is limited, being obtained from batteries, such power dissipation raises the overall power consumption beyond an acceptable level. The large ratio of output to input voltage further aggravates the problems of a PWM switching power supply. Capacitance on the load side of the power transformer would be reflected to the primary by the square of the turns ratio. The total capacitance, then, including that of the transformer and rectifier, would impose a highly reactive load on the power switch. The higher currents associated with such a load tend to further increase switching losses.

Most resonant mode switching power supplies achieve regulation by varying the switching frequency and fixing either the on time or the off time of the switch. FIG. 1 shows a conventional parallel resonant mode switching circuit 2. In this type of circuit, again stray and parasitic capacitances of the load side are reflected into the primary as the square of the turns ratio. As there shown, L1 is the equivalent primary inductance of the power converter transformer and capacitor C1, shown in phantom, represents the reflected load capacitance together with all other parasitic capacitance. Capacitor C2 is a bypass capacitor. Capacitance C1 and inductor L1 together form the resonant tank circuit 4. The power switch S1 directs power into the tank at zero voltage, or zero current in a series resonant tank, of the sinusoidal tank waveform. At these points, no power would be dissipated through the switch, and thus the switching losses of a resonant mode power supply would be much less than those of a PWM power supply. Unlike PWM power supplies, resonant mode power supplies oscillate at a preferred resonant frequency. At resonance, the tank is seen as a resistive load. By minimizing nonproductive reactive currents, switching losses due to these currents can be minimized.

The problem with existing resonant mode IC regulators has been that such components are generally optimized for high power applications which draw power from a conventional AC power line, meaning that the energy supply is inexhaustible, practically speaking, and energy dissipation is generally reduced merely to reduce heat production. In some cases these resonant mode IC regulators have internal circuitry that requires operating voltages greatly exceeding conventional battery voltage levels. In addition, while the power consumption of the internal circuitry in its quiescent or latent state is inconsequential when dealing with power converters connected to the AC line, it becomes very significant in a low power application such as a battery-driven headphone.

Another compromise made by designers of resonant mode power supplies in the past was that, while either the "on" time or the "off" time was fixed, the other period was permitted to vary. Which period is fixed is determined by whether the circuit is a parallel or series resonant tank arrangement. As shown in FIGS. 2A and 2B, though, regardless of which period is fixed, such an arrangement can result in poor synchronization of the switching occurrence with the zero signal occurrence. That is, if the "on" time is too short, as illustrated in FIG. 2A, power switching takes place too early. Similarly, if the "on" time is too long, as illustrated in FIG. 2B, a negative voltage tail occurs. These variations can be caused by variations in input voltage, load and other conditions. In any event, switch current and voltage are both non-zero at the moment of switching.

In the case of the voltage tail shown in FIG. 2B, most practical switching devices cannot accommodate such an occurrence. This leads designers to modify the circuit as shown in FIG. 3 to include clamp means, such as diode D1, to prevent reverse voltage or current in the circuit, resulting in the waveform shown in FIG. 2C. Although energy that is not transferred from the tank into the load is returned to the input power source through this diode D1, energy is still wasted in pushing this return current through the forward voltage drop of the diode. Thus again power consumption and loss are increased.

This invention relates to improvements to some of the devices described above and to solutions to the problems raised or not solved thereby.

SUMMARY OF THE INVENTION

The invention is directed to a current mode zero-voltage parallel resonant switching power supply. Very high efficiency is achieved by automatic self-alignment of the power switch commutation, over a wide range of input voltages, primary transformer inductance, stray and reflected capacitance, and loads. According to the invention, the power supply includes two loops, a voltage regulator loop and a commutation loop, the latter essentially monitoring and controlling the power switch itself.

The commutation loop includes means for comparing against a variable threshold, thus controlling both the on and the off times, resulting in a power supply where neither the on nor the off times are fixed. In particular, besides the switch and the resonant tank circuit of conventional power supplies, the commutation loop includes comparing means for comparing a threshold signal to the output of the tank, and thereby determining the time at which the switching means is closed and the switching means signal level at which the switching means is opened.

In addition to those elements, the voltage regulator loop includes an error amplifier to sample the output voltage from the tank, for use in generating the threshold signal, based on the difference between the actual output and the intended output. The level of the threshold thus varies with a signal proportional to the rectified output of the tank, that is, the absolute value of the tank.

Startup means are provided for initially energizing the tank when the circuit is first powered. This startup means comprises means for energizing the switching means and sensing means for sensing the tank output so as to ensure that the startup means is on only as long as necessary to bring the tank up to its normal operating output level.

Other objects and advantages of the invention will become apparent hereinafter.

DESCRIPTION OF THE DRAWING

FIG. 4 is a schematic depiction of a current mode zero-voltage parallel resonant switching power supply circuit constructed according to one embodiment of the invention.

FIG. 5 is a diagram of a waveform of the output of the circuit shown in FIG. 4, correlated to the closing and opening the power switch.

FIG. 6 is a schematic depiction, mostly in block form, of a current mode zero-voltage parallel resonant switching power supply circuit constructed according to another embodiment of the invention.

FIG. 7 is a schematic depiction, in greater detail, of the power supply circuit shown in FIG. 6.

DESCRIPTION OF THE PREFERRED EMBODIMENT

Figure 1:
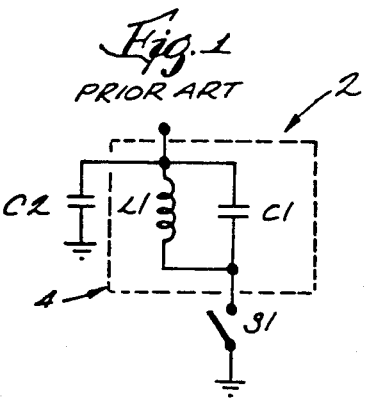
FIG. 1 is a schematic diagram of a conventional parallel resonant mode switching power supply circuit.
Figure 3:
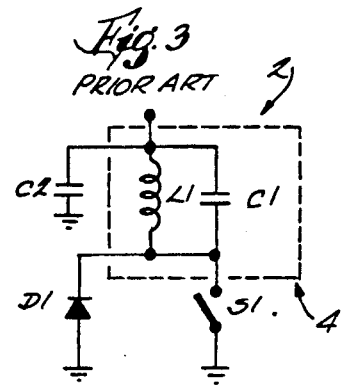
FIG. 3 is a schematic diagram of a circuit similar to that shown in FIG. 1, but including the addition of a diode to prevent negative voltages.
Figure 2A:
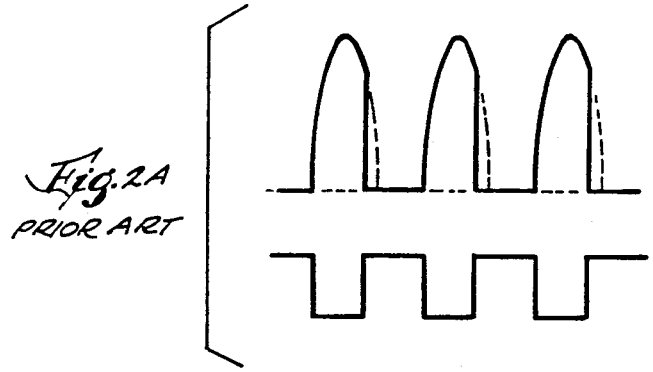
FIGS. 2A, 2B, and 2C are diagrams of waveforms generated by the circuit shown in FIG. 1, correlated to the closing and opening of the power switch.
Figure 2B:
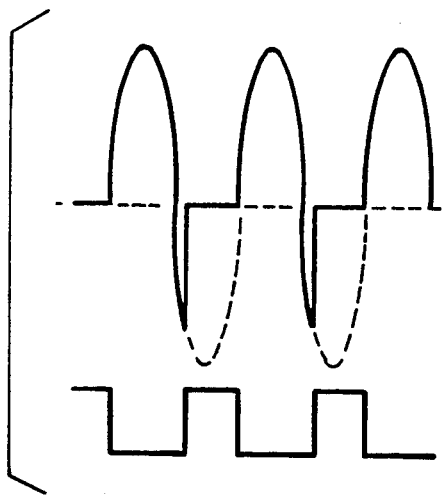
Figure 2C:
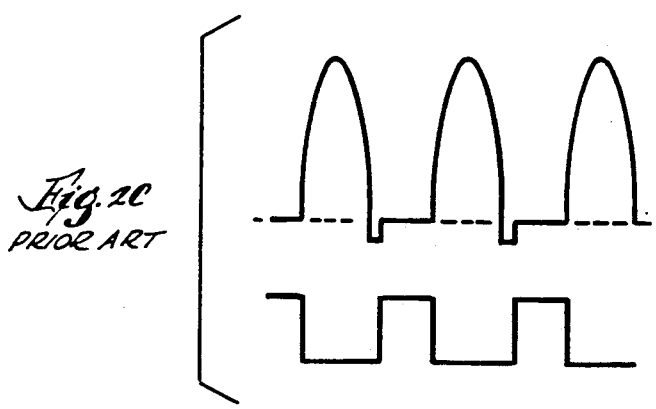

Referring now to FIG. 4, there is shown a diagram, schematic in nature, of a power supply circuit 10 constructed according to one embodiment of the invention in its most basic form. As shown generally in FIG. 4, the power supply circuit 10 includes a tank circuit 12, including an inductor L1 in parallel with a capacitor C1 between a Power In terminal and a Load terminal. Generally a power source or means for supplying energy to the circuit, such as a battery in the application of electrostatic headphones, is connected to the Power In terminal. Capacitor C2, connected between Power In and ground, acts as an input filter capacitor. A switch SW1 is connected at one end to the node connecting the Load terminal to the junction between the inductor L1 and capacitor C1, and at the other end to ground. Switch SW1 is assumed to have a small internal series resistance, represented by resistor R1. A comparing means 14 is provided, such as a comparator, having its inverting input connected across the switch SW1 and its non-inverting input connected to receive a threshold signal Threshold.

In this manner, according to the invention, the circuit 10 will operate cyclicly. That is, assuming no losses in the tank 12 and with no load on the power supply 10, the tank will tend to ring substantially sinusoidally, and will continue to rise to its sinusoidal peak, and then drop back to zero, where the cycle will restart. Assuming the switch SW1 is open at one point in the cycle, the comparing means 14 is comparing the voltage across the switch to the Threshold signal. When the voltage across the switch SW1 descends to the level of Threshold, the switch is closed and residual energy from the tank 12 is in effect pumped back into the supply, although practically the energy is stored in capacitor C2. At that point, current in the inductor L1 reverses, passing through zero, and energy is pumped into the tank 12, which in turn transfers energy to Load. Since the voltage across the switch SW1 is at Threshold when switching occurs, the switching is highly efficient and practically no energy is lost in the switching operation.

The tank will continue to ring substantially sinusoidally with the switch SW1 closed. With the switch SW1 closed, the comparing means 14 is comparing the current through the switch SW1, and hence through the resistor R1, to the Threshold. When that current ascends to the level corresponding to Threshold, the comparing means 14 opens the switch SW1, and the cycle begins anew.

Hence the level taken from the switch SW1, when compared with Threshold, will properly trigger the power switch SW1 so as to avoid energy loss due to lack of synchronization, eliminating the waste of energy referred to above.

The waveform of the voltage across the switch SW1 as generated by the circuit 10 is shown in FIG. 5. As can be seen in that drawing figure, during the period when the switch SW1 is closed, the base of the clipped sine curve is not flat, but a ramp. This ramp is a result of the growing inductor current through the switch SW1, due to resistance R1. When the voltage across this resistance exceeds Threshold, indicative of the current through the switch dropping to a level corresponding to Threshold, as indicated above, the switch is opened. Maximum current is then a function of the relation between the level of the Threshold voltage and the power switch resistance. When the switch SW1 opens, the magnetic field in the inductor L1 of the tank 12 begins to collapse, making the voltage across the switch rise at a rate determined by the tank's resonant frequency. This voltage rise provides positive feedback to the comparing means 14, which holds the switch SW1 in an "off" state. The voltage across the switch SW1 will rise to a peak value determined by the LC time constant of the tank 12 and the amount of energy stored in the tank. At peak voltage, the current flow in the inductor portion of the tank 12 has fallen to zero and then reverses direction, resulting in the voltage dropping back to zero along a sine curve, following the tank's resonant frequency, as shown in the remaining portion of the waveform of FIG. 5. As the energy in the inductor portion of the tank 12 is completely drained and returned to the source, the voltage across the switch SW1 reaches zero, the switch closes, and the cycle repeats itself.

Another embodiment of the power supply circuit according to the invention is shown in FIGS. 6 and 7. Referring first to FIG. 6, the power supply circuit 100, as with the circuit 10 shown in FIG. 4, includes a tank circuit 120, with Power In and Load terminals, connected through switch SW10 to ground. The internal resistance of SW10 is shown as resistor R10. Also as was the case with the circuit 10 shown in FIG. 4, the circuit 100 includes a comparing means 140, with its non-inverting input connected to Threshold and its inverting input connected to gauge the voltage across the switch SW10 and the current through the switch. In this embodiment, the circuit 100 includes an error amplifier 160, which takes a signal from the tank circuit 120 and compares it to a reference level Reference to arrive at the Threshold signal, provided to the comparing means 140. In addition the circuit 100 includes a startup circuit 180. While the detail of the function and structure of the startup circuit 180 will be explained more fully hereinafter, basically it is provided to pump energy into the tank circuit 120 when the tank circuit does not have sufficient energy to carry through the cycle on its own, such as when the circuit is first powered or when accomplished, the startup circuit 180 disables itself until it is again needed.

FIG. 7 shows the detail of the circuit 100 shown in the block diagram of FIG. 6. As there shown, the tank circuit 120 includes an LC pair formed of a transformer T1, and a capacitor C1 representing the stray capacitance of the transformer. As indicated earlier, the stray and parasitic capacitances of the load side of the transformer are reflected into the primary as the square of the turns ratio. Thus for instance assuming that the stray capacitance is measured at 30 pF and the turns ratio being used is 37 to 1, the stray capacitance on the primary side, even ignoring the stray capacitances of other components, exceeds 0.04 $\mu$F. Capacitor C2, connected between Power In and ground, acts as an input filter capacitor.

A diode D1, connected between T1$_{Secondary}$ and the Load, and a capacitor C3, connected between Load and ground, act as rectifier and filter for providing $-600$ volts to the Load, in the embodiment of the circuit directed to electrostatic headphones, while a diode D1', connected between T1$_{Secondary}$' and the Load, and a capacitor C3', connected between Load and ground, act as rectifier and filter for providing $+600$ volts to the Load. Capacitances CD and CD' are innate capacitances of the diodes D1 and D1' respectively, and form part of the stray capacitance reflected into the transformer T1.

The junction between T1$_{Primary}$ and C1 is connected to ground by switch SW10, which in the most preferred embodiment is a semiconductor switch, such as an N-channel power field effect transistor (FET). Resistor R1, shown in series with SW10, represents the internal resistance of the FET since, as referred to above, any such practical power switch will have some determinable resistance. This resistance is very small, often on the order of about 0.15$\Omega$, but it is nevertheless clearly present. It is one of the objects of the invention to advantageously employ this resistance in measuring current and controlling the switch in response to the current measured thereby, in lieu of a separate and added resistor which would be wasteful of energy.

The error amplifier circuit 160 includes a pair of resistors R2 and R3 for dividing the power supply output voltage, as indicated above in the range of about $-600$ volts particularly if the application is for driving electrostatic headphones, down to a level that is within the common mode range of operational amplifier ICs. The power supply output voltage is thus referenced against a voltage source Reference. The junction between resistors R2 and R3 is connected to the non-inverting input of an operational amplifier U1. The operational amplifier U1 together with the associated circuitry forms a generally conventional error amplifier. Resistor R4 and capacitor C5, connected in series between the output of U1 and the inverting input, together with resistor R5 between the inverting input and ground, stabilize the control loop of the error amplifier. Resistors R6 and R7, connected in series between the output of U1 and ground, comprise a voltage divider and have relative values such that, at the junction between them, a voltage signal exists which, as will be described subsequently, limits the maximum current permitted into the switch SW10. Thus the circuit is protected from short circuit and current is limited at startup.

The junction between the resistors R6 and R7 is the point at which Threshold exists. This junction is connected to the inverting input of a comparing means 14, such as a comparator U2, while the non-inverting input receives a signal from the drain of the switch SW10, via an N-channel FET Q2, the function and purpose of which is explained more fully below, and a resistor R8. The output of the comparator U2 is connected to and drives the power switch SW10.

Thus, as indicated above referring to FIG. 6, when switch SW10 is open, this comparator U2 compares Threshold against the voltage across the power switch SW10, causing the switch to close when that voltage drops to equal Threshold. Once the switch SW10 is closed, the comparator U2 compares the current through the switch to Threshold, switching SW10 open when that current drops to equal a level corresponding to Threshold.

The function of FET Q2 is two-fold. First, it clamps the non-inverting input of comparator U2 within its common mode range. In addition, and possibly more important, FET Q2 permits the entire circuit 10 to be shut down by removing the supply voltage from the gate of Q2. This disconnects the leakage path through the power transformer T1, resistor R8 and the input circuitry of U2.

As stated above, the purpose of the startup circuit 180 is to permit energy to flow into the tank circuit 120, to bring the tank up to the proper level so as to remain cycling on its own. In fact, the startup circuit 180 has three modes including initial power and restart modes, it causes at least one cycle of the switch SW10 and forces enough energy into the tank 120 to sustain power converter operation. In the disabled state, the output of comparator U4 appears as an open circuit, effectively disconnecting it from the switch control circuit.

In the initial condition, capacitor C6 is discharged. Connected between the non-inverted input of comparator U4 and ground, this discharged condition guarantees that the non-inverting input voltage will be less than Threshold, which is provided by the error amplifier 160 to the inverting input of the comparator U4. This condition forces comparator U4 output to be active and low. That output is connected to one end of resistor R13. The other end is attached to both resistor R8 and the inverting input of comparator U2. Resistor R8 and R13 form a voltage divider. As explained previously, FET Q2 connected in series with R8 limits the voltage at its junction with R8 to about the voltage of the power supply, in this example $+5$ volts, applied to its gate pin, minus the gate/source turn-on threshold of Q2. Thus regardless of power input voltage or ringing of the resonant tank, the voltager at the junction of transistor Q2 and resistor R8 will be less than about 3 volts.

When power is first applied to the circuit 100, the error amplifier 160 will see no power supply output voltage and will push its output, Threshold, to its maximum value. This signal is applied to the non-inverting input of comparator U2. R8 and R13 have such values that the voltage at the inverting input of comparator U2 will be less than that applied to the non-inverting pin. Hence the output of U2 will be forced high. In turn, the output of comparator U2 enables SW10, forcing energy into the tank.

The output of comparator U2 also drives resistor R10. The outer end of R10 connects to a node that includes resistor R11 and R12, capacitor C6, and the non-inverting input of comparator U4. Once the output of comparator U2 drives resistor R10 high, the rate of charge of capacitor C6 increases. When power was first applied, resistor R10 was driven to ground potential by the switch central comparator U2 effectively connecting it in parallel with R12. The Thevenin equivalent voltage of the R10, R11, R12 network that is available to charge C6 is relatively small.

Once the output of comparator U2 drives resistor R10 high, the Thevenin equivalent voltage of R10, R11, R12 that charges C6 is larger. Capacitor C6 ultimately charges to a voltage that is greater than Threshold, whereupon comparator U4 disables the start-up circuit 180. Under normal operating conditions, the output of comparator U2 is toggling power switch SW10 via the gate of SW10. At the same time it is toggling the voltage applied to resistor R10. Capacitor C6 settles at a voltage between the high and low Thevenin equivalent voltages associated with R10, R11 and R12 that were described previously, but higher than Threshold, so that the startup circuit 180 remains disabled under normal operating conditions.

Under a load dump condition, the output voltage of the power converter becomes slightly larger than its desired steady state value. As a result, the Threshold signal from the error amplifier circuit 160 slews to ground potential, and power switch SW10 action ceases. Again, this Threshold signal is continually applied to the inverting input of startup circuit comparator U4. Since that signal is in this case less than the voltage retained by capacitor C6 on the non-inverting input of comparator U4, the startup circuit 180 becomes active as in the initial power application mode.

Resistors R8 and R13 play another role besides that described above. They divide the voltage developed by current flowing through the resistance of SW10 shown as R1 in FIG. 6. This establishes a start-up current limit that is higher than that of normal operation to quickly charge the power supply output capacitors C3 and C3', and reach steady state operation.

Hence according to the invention the circuit provides a power supply capable of delivering high voltages with greatly minimized loss of power in the switching operation, by synchronizing the switching with the point in the cycle where the least power will be loss.

While the apparatus hereinbefore described is effectively adapted to fulfill the aforesaid objects, it is to be understood that the invention is not intended to be limited to the specific preferred embodiment of switching power supply set forth above. Rather, it is to be taken as including all reasonable equivalents within the scope of the following claims.

What is claimed is:

1. A switching power supply comprising:
   a resonant tank including an inductor-capacitor pair, and having an output level which is capable of varying;
   means for supplying an energy input to said tank;
   solid state switching means for controlling said energy input to said tank;
   means for providing a threshold signal; and
   means for comparing a signal from said switching means, said signal originating from and caused by an inherent internal resistance within said switching means, with said threshold signal and thereby determining the time at which the switching means is closed and the switching means signal level at which the switching means is opened.

2. A switching power supply as recited in claim 1 wherein said comparing means compares the threshold signal to a voltage across the switching means, closing the switching means when the voltage is the same as the threshold signal, and opening the switching means when the current through the switching means is at a level that corresponds to the threshold signal.

3. A switching power supply comprising:
   A resonant tank including an inductor-capacitor pair, and having an output level which is capable of varying;
   means for supplying an energy input to said tank;
   switching means for controlling said energy input to said tank;
   means for providing a threshold signal; and
   means for comparing a signal from said switching means with said threshold signal and thereby determining the time at which the switching means is closed and the switching means signal level at which the switching means is opened;
   said comparing means comparing the threshold signal to a voltage across the switching means, closing the switching means when the voltage is the same as the threshold signal, and opening the switching means when the current through the switching means is at a level that corresponds to the threshold signal;
   wherein the threshold signal is supplied by error amplifier means, for comparing the output level of said tank to the level of a reference to produce said threshold signal, based on the difference between said output level and said reference level.

4. A switching power supply as recited in claim 3 further comprising startup means for initially energizing said tank.

5. A switching power supply as recited in claim 4 wherein said startup means comprises means for energizing said switching means regardless of the threshold signal, and for disabling itself once the tank circuit reaches its normal operating output level.

6. A switching power supply as recited in claim 4 wherein said error amplifier means includes a comparator for comparing said reference signal to a signal corresponding to the output level of said tank.

* * * * *